United States Patent [19]

Giallorenzi et al.

[11] 4,291,939
[45] Sep. 29, 1981

[54] POLARIZATION-INDEPENDENT OPTICAL SWITCHES/MODULATORS

[75] Inventors: Thomas G. Giallorenzi, Springfield; Richard A. Steinberg, Alexandria, both of Va.

[73] Assignee: The United States of America as represented by the Secretary of the Navy, Washington, D.C.

[21] Appl. No.: 889,666

[22] Filed: Mar. 24, 1978

[51] Int. Cl.³ .............................................. G02B 5/174
[52] U.S. Cl. .................................. 350/96.14; 350/374
[58] Field of Search ............... 350/96.12, 96.13, 96.14, 350/150, 355, 370, 374, 380, 382

[56] References Cited

U.S. PATENT DOCUMENTS

| | | | |
|---|---|---|---|
| 3,874,782 | 4/1975 | Schmidt | 350/96.13 |
| 3,909,108 | 9/1975 | Taylor | 350/96.14 |
| 4,012,113 | 3/1977 | Kogelnik et al. | 350/96.13 |
| 4,070,094 | 1/1978 | Martin | 350/96.14 |
| 4,157,860 | 6/1979 | Marcatili | 350/96.14 |

OTHER PUBLICATIONS

Burns et al., "Optical Modal Evolution 3-dB Coupler", *Applied Optics*, vol. 15, No. 4, Apr. 1976, pp. 1053-1065.
Kogelnik et al., "Switched Directional Couplers with Alternating $\Delta\beta$", *IEEE Journ. Quant. Elect.*, vol. QE-12, No. 7. Jul. 1976, pp. 396-401.
Steinberg et al., "Performance Limitations Imposed on . . . ", *Applied Optics*, vol. 15, No. 10, Oct. 1976, pp. 2440-2453.
Steinberg et al., "Polarization-Insensitive Integrated-Optical Switches: . . . ", *Applied Optics*, vol. 16, No. 8, Aug. 1977, pp. 2166-2170.

*Primary Examiner*—John D. Lee
*Attorney, Agent, or Firm*—R. S. Sciascia; William T. Ellis; William C. Daubenspeck

[57] ABSTRACT

Optical channel waveguide switches/modulators having polarization-independent operation are disclosed. Electrodes are disposed in proximity to the waveguide channels to provide an electric field that is primarily horizontally directed in at least one channel and an electric field that is primarily vertically directed in at least one channel. Since the different electric-field orientations electrooptically induce different changes in the index of refraction for waves of different polarization in the guides, this permits improved electrooptic control over both TM-like and TE-like modes. Embodiments of both modal interference switches/modulators and branching waveguide switches/modulators are disclosed.

16 Claims, 17 Drawing Figures

POLARIZATION-INDEPENDENT OPTICAL SWITCHES/MODULATORS

BACKGROUND OF THE INVENTION

This invention relates in general to optical data transfer systems and especially to integrated optical switches and modulators. More particularly, this invention relates to polarization-independent integrated optical switches and modulators suitable for use with fiber optical transmission lines.

In the past several years, significant progress has been made in the construction of microoptical thin-film electro-optical switches and modulators. These devices are capable of impressing broadband information on optical carriers with efficiencies heretofore not realizable. However, most of these devices suffer from large interchannel crosstalk caused by the inability to fabricate these devices within demanding tolerance requirements. An approach to alleviating the demanding tolerance requirements in channel-waveguide switches was recently demonstrated by H. W. Kogelnik and R. V. Schmidt (See U.S. Pat. No. 4,012,113 and IEEE Journal of Quantum Electronics, Vol. QE-12, No. 7, July 1976). Their design significantly reduced interchannel crosstalk by compensating for errors in fabrication by application of voltage to multiple-section electrodes. The drawback of their design was that, in general, it was restricted to a single polarization; that is, it could only efficiently switch a single polarization at a time.

The polarization properties of integrated optical switches and modulators are of great importance in determining the usefulness of these devices in an optical data transfer system employing fiber transmission lines. In particular, these devices must perform efficient and complete switching of light, without regard to its state of polarization. This requirement arises because linearly polarized light coupled into single mode, circular fibers suffers a rapid conversion to other polarization states. Light coupled from a fiber is therefore expected to possess an unknown elliptical polarization and both TE- and TM-like modes will be excited in the integrated optical circuit. Any optical switch must act in identical fashion upon each of the constituent polarizations in order to achieve suitably low interchannel crosstalk.

SUMMARY OF THE INVENTION

The present invention is a new electrode design which permits the fabrication of polarization-independent switches/modulators for most crystallographic directions. This feature permits the use of the largest electrooptic coefficients thus resulting in optimized device performance and enabling fabrication of switches in directions which are suitable for cleaving. This latter feature is significant (in $LiNbO_3$ for example) because high quality cleaved edges are required for end-fire-type fiber-to-film couplers. Highly polished edges may also be suitable for coupling to fibers; however, polishing will generally be more expensive to implement. Electrical control of the output for both polarizations with low cross-talk is possible. In addition, the electrode design permits electrical compensation of fabricational errors.

In the present invention electric fields of two orientations are applied simultaneously to channel waveguides in optical switches/modulators. In one orientation, the primary component of the field is orthogonal to the substrate surface and orthogonal to the direction of propagation in the channel. In the other orientation, the primary component of the field is parallel to the substrate surface and orthogonal to the direction of propagation in the channel. The electrooptically induced change in the index of refraction is dependent on the direction of the applied field and is different for waves of differing polarizations. Therefore, through the use of both electric-field orientations, almost arbitrary control over the induced change in the index is possible. This allows the design of a switch which operates on both TM-like and TE-like polarizations in a substantially identical manner. The present invention is applicable to both modal interference switches/modulators and branching waveguide switches/modulators and polarization-independent embodiments of both types of couplers are described.

Additional advantages and features of the invention will be readily appreciated as the same becomes better understood by reference to the following detailed description when considered in conjunction with the accompanying drawings wherein:

DESCRIPTION OF THE PREFERRED EMBODIMENT

Figure 1:
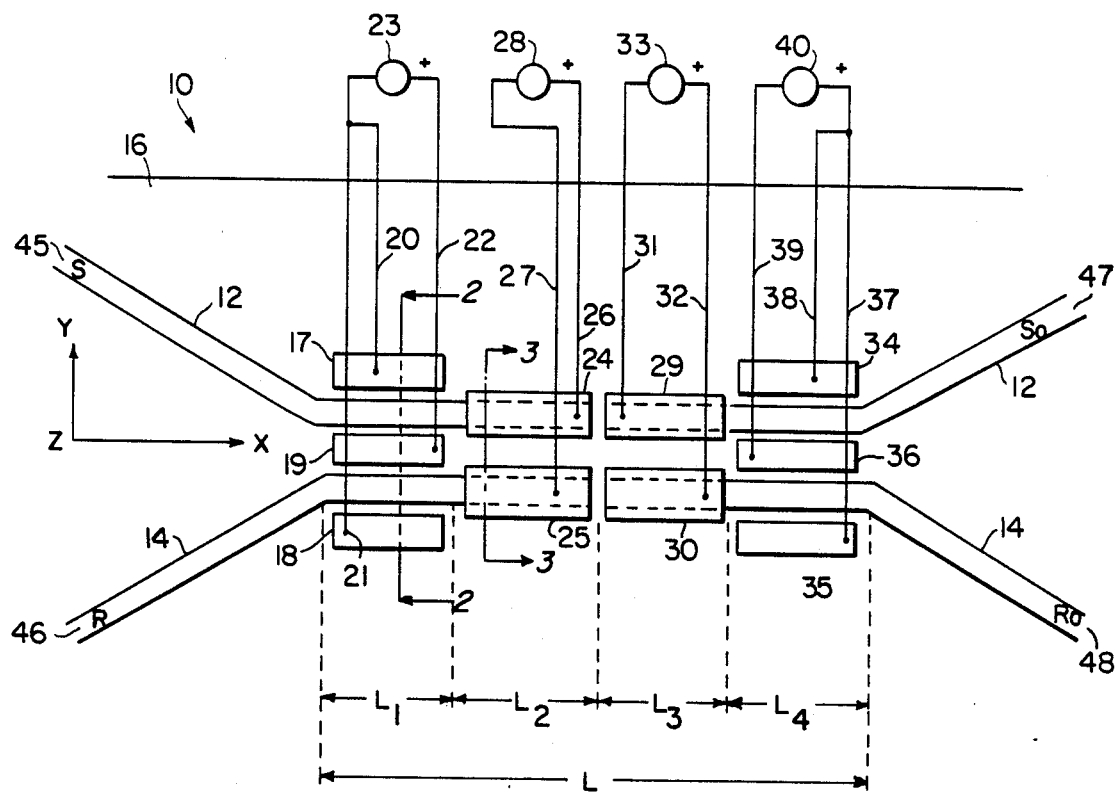
FIG. 1 illustrates a modal interference directional coupler providing polarization-independent operation according to the present invention.

FIG. 1 shows a 2-port×2-port modal interference directional coupler 10 having an electrode configuration to provide polarization-independent operation as contemplated by the present invention. Two channel waveguides 12 and 14 are fabricated by conventional techniques in or on an electrooptic substrate 16. Embedded channels are shown. Crystals commonly used in fabricating electrooptic switches include the ferroelectrics $LiNbO_3$ and $LiTaO_3$, Group III–IV semiconductors such as GaAs, and Group II–VI semiconductors such as CdSe. In an interaction region L, the two waveguides 12 and 14 are parallel and spaced apart a distance which permits fields from one channel to interact with fields from the other channel, thus permitting power transfer between the guides. This type of design is commonly referred to as a type I modal interference modulator as is well-known in the art. Electrodes placed in the vicinity of the guides permit the application of an electric field. This field changes the index of refraction of the material (both substrate and the guides) through the electrooptic effect and this causes the interaction between the guides to increase or decrease depending on the design. By affecting the interaction between the guides, it is possible to control the power transferred between them.

The manner in which a light beam couples its energy back and forth between two parallel dielectric channels can be completely characterized by three numbers: L, $\Delta\beta$, and $\kappa$. The interaction length L is the physical distance over which the fields of each guide interact. The difference $\Delta\beta$ between the modal wavenumbers of the two channels is a measure of the asymmetry of the refractive index distribution, and/or the channel geometric asymmetry. If the channels have been realized in an electrooptically active medium (e.g., $LiNbO_3$), the effective index asymmetry (and thus $\Delta\beta$) can be controlled by applying a voltage to electrodes deposited on the surface of the device. The coefficient $\kappa$ is a measure of the strength of the interchannel coupling. The physical interpretation of $\kappa$ is simplified by considering situations for which $\Delta\beta=0$; in this case, the distance l over which 100 percent power transfer occurs is given by $l=(\pi/2\kappa)$.

Figure 2:
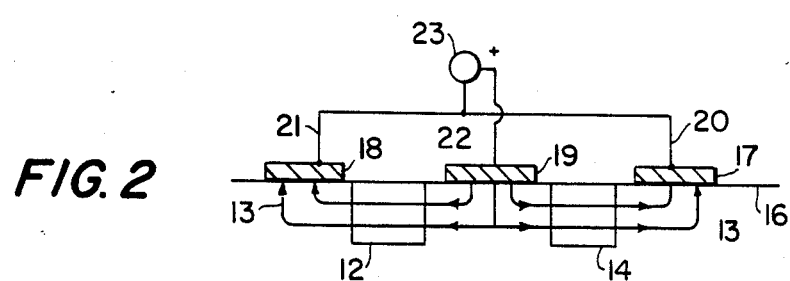
FIGS. 2 and 3 are cross-sectional views of the coupler of FIG. 1 taken along line 2—2 and line 3—3, respectively, illustrating the electric field orientation along line 2—2 and line 3—3, respectively.

The novel feature of the coupler 10 is the use of two different electrode configurations which enables the application of fields of two orientations to the interaction region. As shown in FIG. 1, the interaction region L is divided into four sections, the first of which includes three electrodes of length $L_1$, electrodes 17 and 18 being outside channels 12 and 14, respectively, and electrode 19 being disposed between the waveguides. Electrodes 17, 18, and 19 have terminals 20, 21, and 22, respectively, for connection to a source of potential 23 which is applied between central electrode 19 and the outside electrodes 17 and 18. As more clearly shown in FIG. 2, this electrode configuration (Configuration 1) allows the application of an electric field in which the principle component (indicated by lines 13) is parallel to the surface of the substrate 12 and orthogonal to the direction of the waveguides 12 and 14; that is, the principle component is in the Y direction as defined in FIG. 1. For convenience the fields provided by Configuration 1 electrodes will be referred to as primarily horizontally-directed fields.

Figure 3:
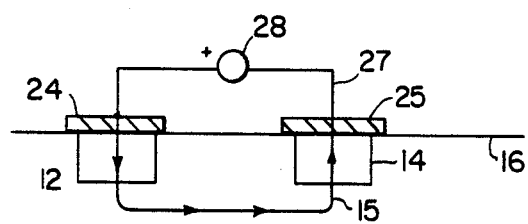

The second section of the coupling region L includes two electrodes of length $L_2$, electrodes 24 and 25, which are disposed over the waveguides 12 and 14 and have terminals 26 and 27 for connection to a source of potential 28. As shown in FIG. 3, this electrode configuration (Configuration 2) allows the application of field components (indicated by line 15) which are principally orthogonal to the plane of the substrate 16 and orthogonal to the direction of the guides; that is, the principle component is in the Z direction as defined in FIG. 1. For convenience the fields provided by Configuration 2 electrodes will be referred to as primarily vertically-directed fields.

The third section of interaction region L includes a second set of Configuration 2 electrodes 29 and 30 disposed over waveguides 12 and 14 having terminals 31 and 32, respectively, for connection to a source of potential 33. The fourth section includes a second set of Configuration 1 electrodes of length $L_4$. Electrodes 34 and 35 are disposed outside waveguides 12 and 14, respectively, and electrode 36 is disposed between the guides. Electrodes 34, 35, and 36 have terminals 37, 38 and 39, respectively, for connection to a source of potential 40 which is applied between the central electrode 36 and the outside electrodes 34 and 35.

As shown in FIG. 1, the source of potential 23 and 40 are coupled to the Configuration 1 electrodes so that the relative polarities of the potential applied to the first and fourth sections are of opposite sense. Similarly, the sources of potential 28 and 33 are coupled to the Configuration 2 electrodes so that the relative polarities of the potential applied in the second and third section are of opposite sense. As will be recognized by a person skilled in the art, this arrangement provides double $\Delta\beta$ reversal.

The sequence of electrode configurations shown in FIG. 1 can be interchanged as long as the $\Delta\beta$ reversal characteristics are maintained. For example, the first and fourth sections may have Configuration 2 electrodes and the second and third sections may have Configuration 1 electrodes. Additional electrode sections may be added to provide additional control of $\Delta\beta$, but in general, this should not be necessary. The phase shift induced in each section of the coupler will of course depend on the magnitude of the applied potential and the length of the electrodes.

Since the electrooptic effect is a tensor quantity which is dependent on the direction of the applied fields, the fields applied by Configuration 1 and Configuration 2 electrode structures will induce different changes in the index of refraction for waves of the same or different polarizations. The use of the combination of the two electrode configurations introduces a new degree of freedom in tuning the switch. As will be seen in the following analysis, this new degree of freedom can be used to achieve polarization-independent operation.

To visualize these new features, consider X-directed propagation in Z-cut $LiNbO_3$. For this orientation, the vertically applied fields $E_z$ cause index changes for both TE- and TM-like modes: $\Delta n_{TE}=r_{13}E_z$, $\Delta n_{TM}=r_{33}E_z$; however, the horizontally applied fields $E_y$ affect only the TE-like modes: $\Delta n_{TE}=r_{22}E_y$, $\Delta n_{TM}=0$. The $r_{ij}$ are the usual linear electrooptic coefficients. (See S. H. Wemple, "Electrooptics Materials," in *Laser Handbook*, F. T. Arecchi and E. O. Schulze-DuBois, Eds, (North Holland, Amsterdam, 1972), Chapter D2, p. 975). The point to be made is that for Z-cut, X-propagation, an electric field applied by Configuration 2 electrodes affects both TE-like and TM-like modes whereas the field applied by Configuration 1 electrodes affects only the TE-like modes. Therefore, to direct both polarizations to a desired output simultaneously (i.e. polarization-independent operation), the procedure is to adjust $E_z$ via the Configuration 2 electrodes, of the second and third sections to produce the extinction of the TM-like mode at the other output. Thus the TM-like mode is directed to the chosen output. Then by applying $E_y$ via the Configuration 1 electrodes of the first and fourth sections, the TE-like mode may be directed to the chosen output. This step will not alter the TM-mode switching state since $\Delta n_{TM}=0$ for variations in $E_y$. To provide polarization-independent operation for the other switching state, the foregoing procedure must be repeated. If, for example, the voltages have been adjusted for crossover operation according to the foregoing procedure, polarization-independent operation in the straight-through state may be provided by sequentially adjusting $E_z$ and $E_y$ to provide extinction of both modes in the crossover channel.

This crystal cut and propagation (Z-cut, X-propagation) is particularly interesting because the TE-like mode can be peaked without modifying the tuning of the TM-like mode. In the general case, however, both the horizontal and vertical fields affect both TE-like and TM-like modes. The fact that the TE and TM electrooptic effects are different allows for polarization-independent operation in the general case; however, an iterative tuning procedure is required to give good channel isolation for both polarizations.

It is noted that if perfect waveguide and electrode symmetry is achieved in fabrication, the voltages applied to both sets of configuration 2 electrodes will be equal and the voltages applied to both sets of configuration 1 electrodes will be equal. However, fabricational asymmetry is the usual case and nonequal voltages may be applied to electrically compensate for fabricational errors. In the general (asymmetric fabrication) case, two voltages may be required for each section (one for straight-through operation and one for crossover operation) and the magnitude may vary from section to section. Thus, in general, eight voltages may be required for polarization-independent operation.

Before discussing additional embodiments of switches/modulators (See FIGS. 8-13) employing the principles of the present invention to provide polarization-independent operation, the design of the directional coupler 10 of FIG. 1 will now be described in detail. The embodiment has been chosen for more detailed explanation because it is the most complicated embodiment included in this disclosure. The operation of the additional embodiments will be apparent to a person of ordinary skill in the art in view of the following explanation.

Light is incident on either port 45 of waveguide 12 or port 46 of waveguide 14. In particular, this light may be obtained as the output of an optical fiber transmission line. By applying suitable voltages to the electrodes, the incident light may be directed to either port 47 of waveguide 12 or port 48 of waveguide 14. The operation of the coupler 10 is specified by the matrix equation $$\begin{pmatrix} R \\ S \end{pmatrix} = M \begin{pmatrix} R_o \\ S_o \end{pmatrix} \quad (1)$$

where $S$, $R$, $S_o$, and $R_o$ denote the complex amplitude of the field at ports 45, 46, 47, and 48, respectively. The transfer matrix $M$ is Equation (1) is given by $$M = \begin{pmatrix} A & -jB \\ -jB^* & A \end{pmatrix}, \quad (2)$$

where $A$ and $B$ are obtained by multiplying the transfer matrices of the various sections together. See IEEE J. Quantum Electronics, Vol. QE-13, No. 4, 122 (1977) for examples of these multiplications. Two states of operation are desired in this type of switch: (1) the crossover state (⊗-state) in which the input power is switched from one channel guide to another (e.g., $R_o \to S$) and (2) the straight-through state (⊖-state), in which the output power exits from the input channel guide (e.g., $R_o \to R$). Assume that only the R channel is initially excited, i.e., $R_o \neq 0$, $S_o = 0$. It follows from Eqs. (1) and (2), that ⊗-state operation is achieved when A=0; similarly, the ⊖-state is activated when B=0. Zero-crosstalk operation of these switches is thus defined by the conditions A=0 or B=0.

In this discussion, it is assumed that $L_4$ equals $L_1$ and $L_3$ equals $L_2$; that is, the three-electrode regions are of equal length and the two electrode regions are of equal length. For this electrode configuration, it may be shown that these conditions in A and B yield the following equations:

⊗-state, (3)

$$B = 0 = 1 + 4\frac{\kappa^4}{\Delta_1^2\Delta_2^2}\sin^2(L_1\Delta_1)\sin^2(L_2\Delta_2) - \frac{2\kappa^2}{\Delta_1^2}\sin^2(L_1\Delta_1) -$$

$$\frac{2\kappa^2}{\Delta_2^2}\sin^2(L_2\Delta_2) - \frac{4\kappa^2}{\Delta_1\Delta_2}\sin(\Delta_1 L_1)\sin(\Delta_2 L_2)$$

$$X\left[\cos(\Delta_1 L_1)\cos(\Delta_2 L_2) - \frac{\delta_1\delta_2}{\Delta_1\Delta_2}\sin(\Delta_1 L_1)\sin(\Delta_2 L_2)\right];$$

⊖-state (4)

$$A = 0 = \frac{1}{\Delta_2}\sin(\Delta_2 L_2)\cos(\Delta_1 L_1) + \frac{1}{\Delta_1}\sin(\Delta_1 L_1)\cos(\Delta_1 L_1).$$

Subscripts 2 and 1 designate quantities appropriate to the three-electrode and two-electrode regions, respectively (cf. FIG. 1) and $L_1$ and $L_2$ are the length of the three-electrode regions and two-electrode regions, respectively. The coupling constant $\kappa$ between the two channel guides is assumed to be the same in both electrode regions. The wave-number mismatch between the two guides is given by $$\delta = \tfrac{1}{2}(\beta_R - \beta_S),$$

where $\beta_R$ and $\beta_S$ are the propagation constants of the lowest-order modal field in R and S, respectively. Since $\delta$ is a function of both the amplitude and direction of the externally applied electric field, the wavenumber mismatch $\delta_1$ in the two-electrode regions is generally not equal to the mismatch $\delta_2$ in the three-electrode regions of FIG. 1. Also, $\Delta$ is defined by $$\Delta^2 = \kappa^2 + \delta^2.$$

It is important to note that Eqs. (3) and (4) must be applied to each polarization component separately. Thus, there are actually two zero-crosstalk conditions that must be satisfied simultaneously in each switching state. For example, in order to specify the zero-crosstalk condition for the ⊗-state, Eq. (3) must be solved twice—first as a constraint on parameters appropriate to the TE polarization and then as an equation on the corresponding TM parameters. Further note that the corresponding TE and TM parameters are generally not equal to one another, e.g., the wavenumber mixmatch $\delta_{1TE}$ for the TE mode in the two-electrode region is generally not equal to the mixmatch $\delta_{1TM}$ for the TM mode in the two-electrode region.

It is convenient to define dimensionless normalized length and normalized voltages as follows:

$$d = (2\kappa/\pi)L, \quad (5)$$

$$V_i = (2L/\pi)\delta_i \quad i=1,2, \quad (6)$$

where strictly speaking, the quantities d, κ, $V_i$, and $\delta_i$ should carry subscripts TE and TM. The rationale for referring to $V_i$ as normalized voltage lies in the linear variation of the wavenumber mixmatch $\delta_i$ with the applied electrode voltage. It is noted that the $V_i$ may be nonzero even in the absence of an applied voltage due to fabricational asymmetry in the parallel channels. However, the analysis is simplified by assuming that the parallel channel configuration has perfect bilateral symmetry, so that the residual normalized voltage offsets are identically zero. This also allows the application of a potential $E_1$ in the two-electrode regions and a potential $E_2$ in the three-electrode regions. Then $$V_{iTE} = C_{iTE} E_i \quad i=1,2,$$

$$V_{iTM} = C_{iTM} E_i \quad i=1,2 \tag{7}$$

where the $C_i$ are functions of the optical wavelength, the waveguide geometry, the electrode geometry, and the Pockels tensor of the dielectric medium. According to Eq. (7), a particular applied electrode voltage gives rise to a different normalized voltage for each polarization.

With the additional definitions $$\begin{aligned}L_1 &= rL_2, \\ C &= \pi/[4(1+r)], \\ \psi_i &= C(d^2 + V_i^2)^{\frac{1}{2}} \quad i=1,2,\end{aligned} \tag{8}$$

Eqs. (3) and (4) may be recast as ⊗-state $$0 = 1 + \left(\frac{2C^2 d^2}{\psi_1 \psi_2}\right)^2 \sin^2\psi_1 \sin^2 r\psi_2 - 2\left(\frac{Cd}{\psi_1}\right)^2 \sin^2\psi_1 - 2\left(\frac{CD}{\psi_2}\right)^2 \sin^2 r\psi_2 - \left(\frac{4C^2 d^2}{\psi_1 \psi_2}\right) \tag{9}$$

$$\times \left[\cos\psi_1 \cos r\psi_2 - \left(\frac{C^2 V_1 V_2}{\psi_1 \psi_2}\right) \sin\psi_1 \sin r\psi_2\right] \sin\psi_1 \sin\psi_2,$$

⊖-state $$0 = \psi_1 \cos\psi_1 \sin r\psi_2 + \psi_2 \sin\psi_1 \cos r\psi_2. \tag{10}$$

Equations (9) and (10) must be solved numerically because of their complicated forms.

As mentioned earlier, the example chosen for examination in detail is that of X-directed propagation in Z-cut LiNbO$_3$. Since $C_{2TM}=0$ cf. Eq. (7), this particular configuration affords considerable independent control over the polarizations.

Intuition has suggested that the following four-step procedure should be followed in tuning the switch of FIG. 1 for polarization-insensitive operation. Although this procedure is presently intended to guide the analysis (and hence device fabrication), it may be interpreted equally well as an experimental prescription for tuning the device once it is fabricated.

(1) Adjust $E_1$ for crossover (i.e., ⊗-state) operation, for the TM-polarized field component.

(2) Adjust $E_2$ until the TE-component is also in the ⊗-state. This second step will not alter the TM switching state established in step (1), since $C_{2TM}=0$. (Upon completion of step 2, polarization-insensitive ⊗-state switching will have been accomplished.)

(3) $E_1$ is readjusted for straight-through (⊖) operation for the TM-polarized field component.

(4) $E_2$ is readjusted until the TE component is also in the ⊖-state. Upon completion of step (4), polarization-insensitive ⊖-state switching will have been accomplished.

Corresponding to step (1) in Sec. III, Eq. (9) is solved subject to the following set of considerations:

(a) The quantities d, $V_i$, and $\psi_i$ in Eq. (9) are those appropriate to TM propagation, i.e., $d_{TM}$, $V_{iTM}$, and $\psi_{iTM}$. For example, Eq. (5) now becomes $$d_{TM} = \left(\frac{2\kappa_{TM}}{\pi}\right) L, \tag{11}$$

where the coupling constant $\kappa_{TM}$ for the TM-polarized field may be determined by measurement or predicted from an electromagnetic analysis.

(b) Set $C_{2TM} = V_{2TM} = 0$, independent of the applied electrode voltage $E_2$. This situation obtains only for the special case presently under consideration: X-directed propagation in Z-cut LiNbO$_3$ for the region 2 electrode configuration of FIG. 1.

(c) A specific value is chosen for r say, r=1.0.

(d) Equation (9) is now interpreted as a correspondence between $V_{1TM}$ and $d_{TM}$, which is written as $$V_{1TM} = f(d_{TM}). \tag{12}$$

Computer-generated plots of Eq. (12) are given in FIG. 4a (for r=1.0). Note that the almost-semicircular solution appearing in FIG. 4(a) is of special significance—it ensures the existence of a normalized voltage $V_{1TM}$ that will drive the device onto the ⊗-state curve for every value of $d_{TM}$ in the range $1 < d_{TM} < 3$. This is extremely important, since the value of $d_{TM}$ established in fabricating the device is difficult to control with high precision. By contrast, conventional switch designs (i.e., those not employing the switched $\Delta\beta$ principle) must be fabricated to a particular prescribed value of $d_{TM}$ in order to achieve ⊗-state switching.

Corresponding to step (2) in Sec. III, Eq. (9) is solved once again, noting that the TE mode properties are now dependent on both $E_1$ and $E_2$ and now subject to the following (different) set of considerations:

(e) The quantities d, $V_i$, and $\psi_i$ in Eq. (9) are appropriate to TE propagation, i.e., $d_{TE}$, $V_{iTE}$, and $\psi_{iTE}$.

(f) From Eq. (7) it is seen that the ratio of normalized voltages $$a \equiv (V_{1TE}/V_{1TM}) = (C_{1TE}/C_{1TM}) \tag{13}$$

is independent of the applied electrode voltage $E_1$. Similarly, the ratio of normalized lengths $$b \equiv (d_{TM}/d_{TE}) = (\kappa_{TM}/\kappa_{TE}) \tag{14}$$

is independent of the device length L.

Using Eqs. (13) and (14), Eq. (12) now defines a correspondence between $V_{1TE}$ and $d_{TE}$:

$$V_{1TE} = af(bd_{TE}) \tag{15}$$

A plot of Eq. (15) (for r=1.0) may be obtained from FIG. 2(a) simply by rescaling the axes in FIG. 4(a). The scale factors a and b have been calculated from electromagnetic theory.

(g) Equation (15) and the results of Eq. (12), i.e., FIG. 4(a), are used as input for the parameter $V_{1TE}$ in Eq. (9). With this input, the resulting correspondence between $V_{2TE}$ and $d_{TM}$ is calculated and the results plotted in FIG. 4(b) (for r=1.0).

For the switch to operate in a polarization-insensitive mode, at a given $d_{TM}$, these must be simultaneously a $V_{1TM}$ and a $V_{2TE}$ solution. From FIG. 4 (b) it is seen that a switching voltage $V_{2TE}$ (needed to achieve X -state operation for the TE mode) exists for all values of $d_{TM}$ in the range $1 < d_{TM} < 3$. However, it was observed in paragraph (d) that this same range of normalized lengths allows for ⊗ -state switching of the TM mode. Thus, it is now assured that polarization-insensitive ⊗ -state switching can be achieved by the device, even if it is fabricated to a highly uncertain normalized length.

Figure 4B:
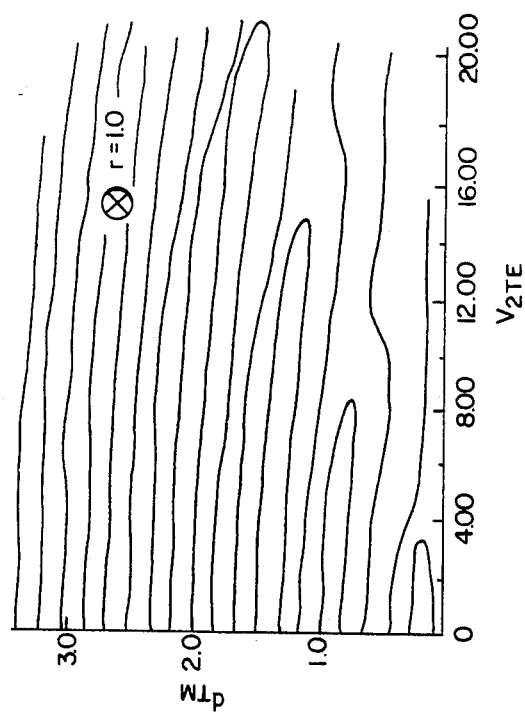
FIGS. 4(a), 4(b), 5(a) and 5(b) are computer-generated plots of crossover switching solutions for the embodiment of FIG. 1.
Figure 4A:
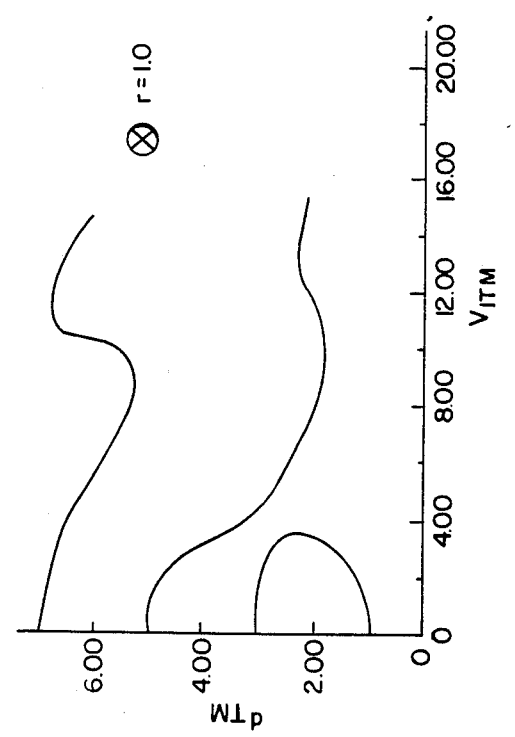
Figure 5B:
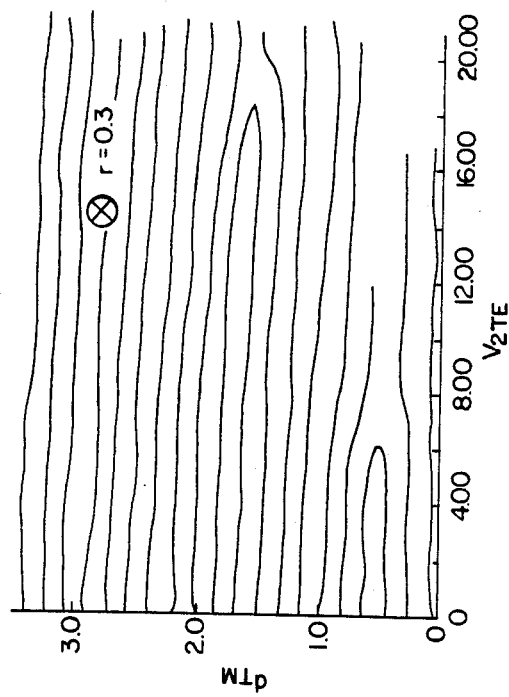
Figure 5A:
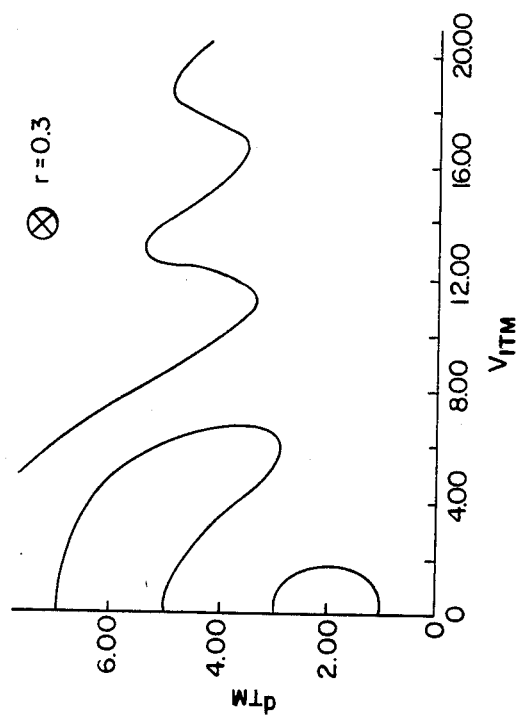

The nearly horizontal curves in FIG. 4b tend to make the magnitude of the TE switching voltage $V_{2TE}$, and thus the required electrode voltage $E_2$, somewhat fabrication-sensitive, i.e., difficult to predict with accuracy prior to actual fabrication and testing of the device. In an attempt, to minimize this sensitivity, the electrode length ratio $r(L_1 = rL_2)$ has been varied. For example, the ⊗ -state results for $r = 0.3$ are shown in FIG. 5. Note that there are fewer looped curves in FIG. 5b($r = 0.3$) than in FIG. 4b ($r = 1.0$). Also the curves in FIG. 5b are even more nearly horizontal than those in FIG. 4b. The solutions for various other values of r indicates that $r = 1.0$ is nearly optimum choice.

In order to perform the ⊖ -state analysis paragraphs (a) through (g) are repeated once again, but with the following change: each reference to Eq. (9) should be replaced by reference to Eq. (10). In all other respects explication of the ⊖ -state analysis follows that of the ⊗ -state analysis presented in the previous section.

Figure 6B:
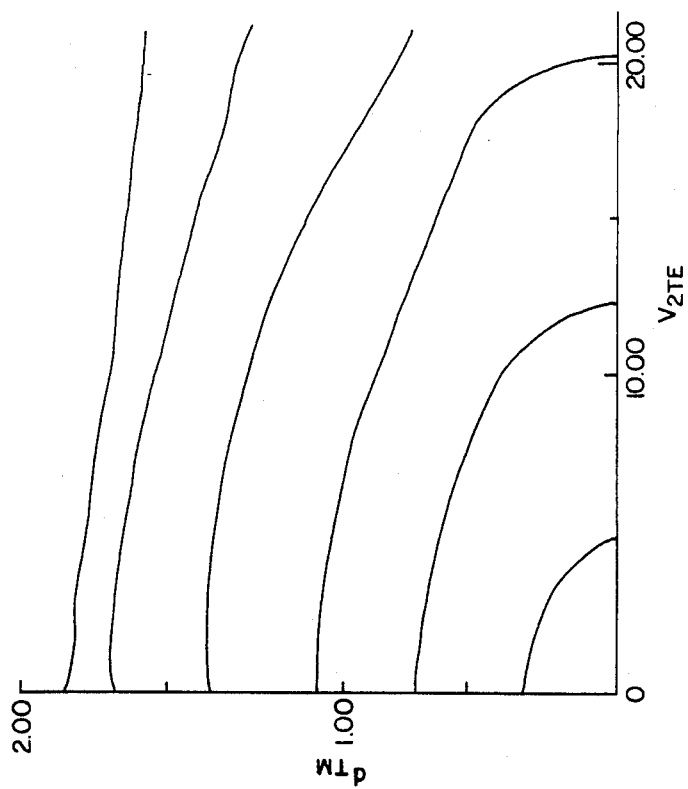
FIGS. 6(a), 6(b), 7(a) and 7(b) are computer-generated plots of straight-through switching solutions for the embodiment of FIG. 1.
Figure 6A:
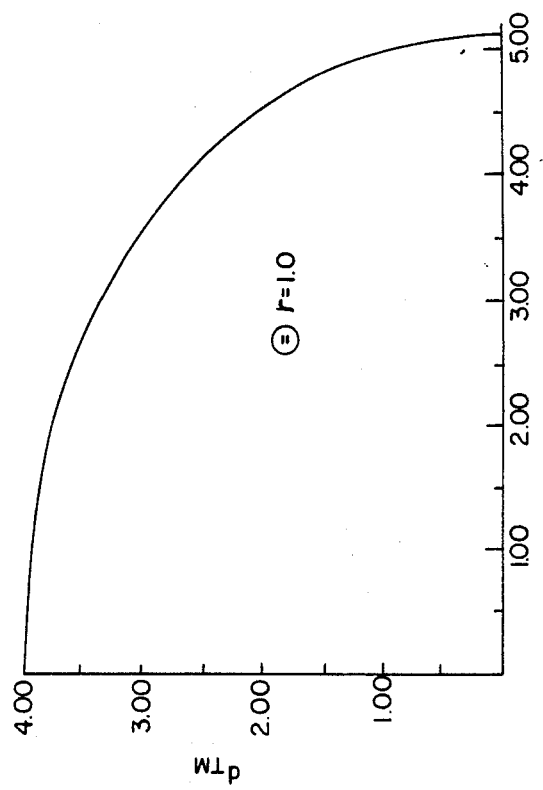

FIG. 6a presents the results for the ⊖ -state. Note that there is always a voltage which permits the TM mode to pass undeflected. Using the results of FIG. 6a, FIG. 6b has been calculated in a fashion similar to that used for FIG. 4. Note that there are multiple solutions of $E_{2TM}$ in the appropriate $d_{TM}$ range. It is therefore concluded from FIGS. 4 and 6 that both TE and TM modes can be manipulated equally through the application of two suitable voltages $E_1$ and $E_2$.

Figure 7B:
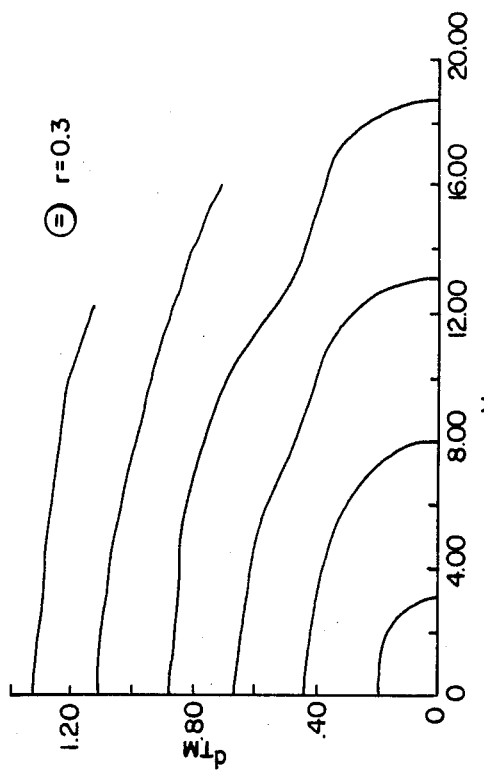
Figure 7A:
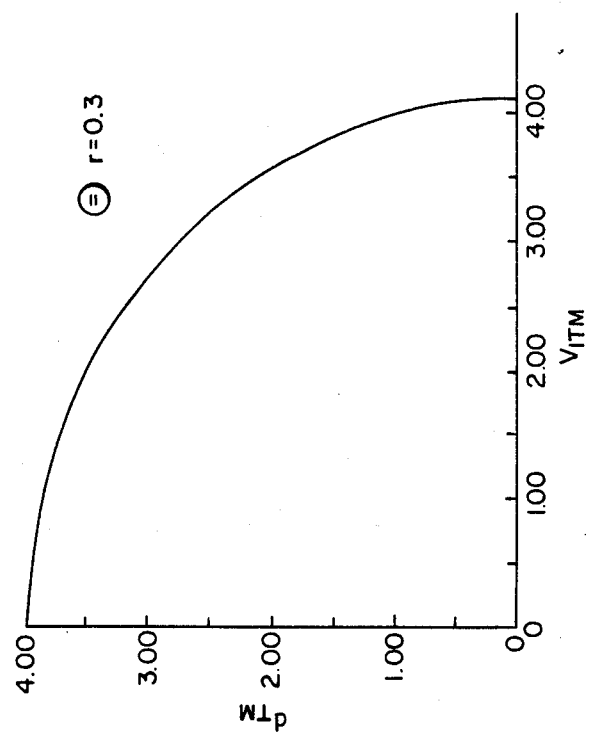

The ⊖ -state results for an electrode ratio $r = 0.3$ are presented in FIG. 7. These results are qualitatively similar to those for $r = 1.0$, and again note from FIGS. 5 and 7 that polarization-insensitive operation is possible. $r = 1.0$ is preferred over $r = 0.3$, because in the former case there are more $E_2$ solutions in the form of looped curves. This suggests lower fabricational tolerances than in the case of nearly horizontal plots. The solutions for various other values of r have also been studied. Generally, it was found as r increases, the looped curves move up the $d_{TM}$ axis of the $V_{1TM}$ plots and that only horizontal curves exist below certain values. For example, in the case $r = 3.0$, the first loop occurs between $d_{TM} = 5$ and 7 and below which only horizontal curves are solutions for the $V_{1TM}$ plots. Noncritical fabrication therefore would require longer devices for the higher r values. $r = 1$ seens to be a nearly optimum choice.

Figure 8:
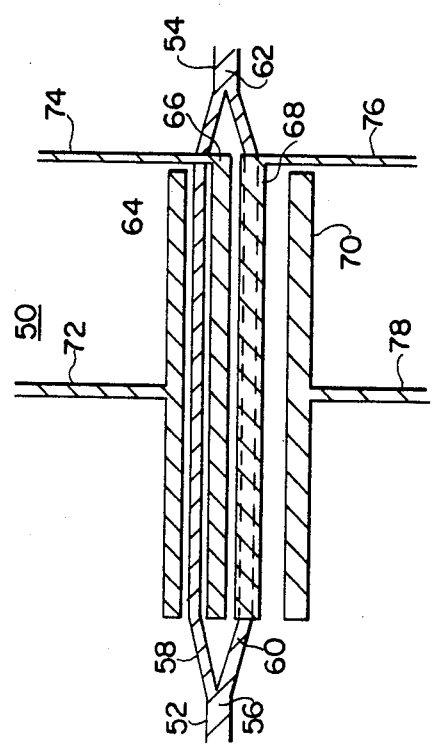
FIG. 8 illustrates an experimental Mach-Zehnder interferometer providing polarization-independent operation according to the present invention.

Referring now to FIG. 8, there is shown an experimental polarization-independent Mach-Zehnder interferrometer 50 (branching-waveguide modulator/switch) having single mode input and output arms 52 and 54. In this type of design, commonly referred to as a type II switch/modulator, the phase-shift region is separated from the channel-coupling region. In reality the device of FIG. 8 is a four-port design with two of the ports being waveguide modes and two of the ports being radiation modes. Light entering the switch 50 at port 56 is equally divided between channel waveguide 58 and channel waveguide 60 and exits through port 62. Electrodes 64 and 66 are disposed adjacent to channel waveguide 58 on each side to provide an electric field which is primarily horizontally directed through the waveguide. Electrode 68 is disposed over and electrode 70 is disposed adjacent to channel waveguide 60 to provide an electric field which is primarily vertically directed through the waveguide. It will be recognized that electrodes 64 and 66 correspond to the electrodes of Configuration 1 and electrodes 68 and 70 correspond to the electrodes of Configuration 2 of the switch of FIG. 1. Terminals 72 and 74 permit the application of an electric potential between electrodes 64 and 66. Likewise, terminals 76 and 78, permit the application of an electric potential between electrodes 68 and 70.

Figure 9:
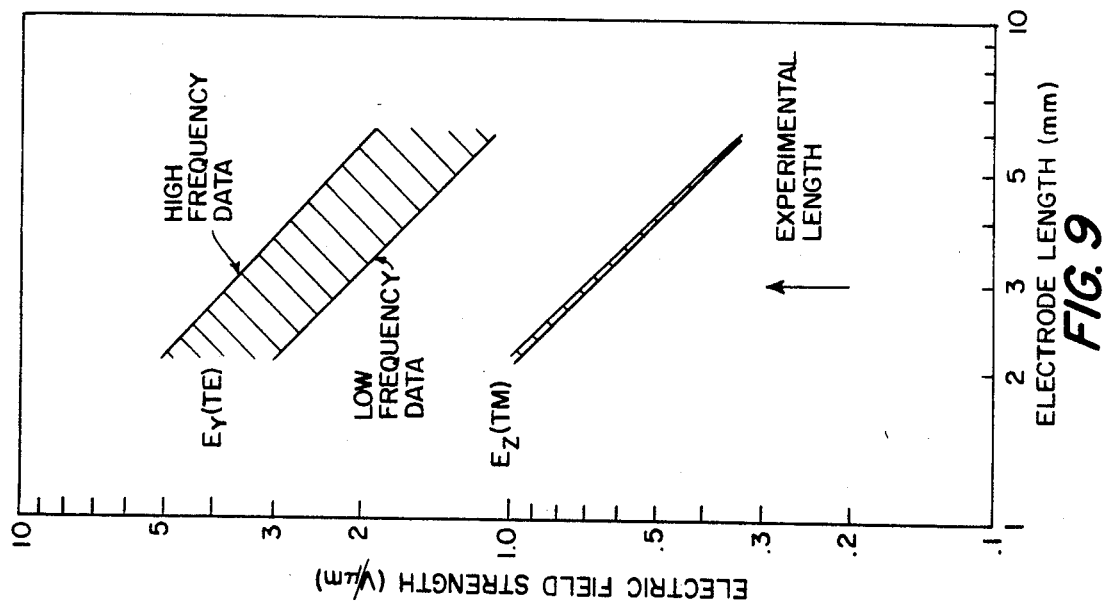
FIG. 9 illustrates the allowed voltages for polarization-independent modulation switching for the device shown in FIG. 8 as a function of electrode length.

The waveguides 58 and 60 were constructed using metal indiffusion in LiNbO$_3$ with propagation in the X-direction of a Z-cut crystal. For this orientation, an examination of the index ellipsoid yields the electrooptic effect for TE and TM modes as $$TE: r_{13}E_z + r_{22}E_y - \frac{2r_{51}^2 E_y^2}{\alpha} = \pi K, \text{ and} \tag{16}$$

$$TM: r_{33}E_z + \frac{2r_{51}^2 E_y^2}{\alpha} \alpha K' \tag{17}$$

where K and K' are defined as (2N/kln$^3$) and (2N'/kln$^3$), respectively, with l being the electrode length, n the refractive index, k the free space wave number, and N and N' being two numbers which specify the required phase shift in terms of $\pi$ needed to obtain switching to a given state. The nonlinear term in electric field comes from mode mixing and is a function of crystal anisotropy $$\alpha \left( = \frac{N_o^2 - N_e^2}{N_o^2 N_e^2} \right),$$

where $N_o$ and $N_e$ are the ordinary and extraordinary indices of refraction. FIG. 9 shows the unique electric field solutions that can be obtained for equations (16) and (17) assuming $N = N' = 1$. It can be seen that for an electrode length l of 3 millimeters, $E_y \sim 2.5$ V/um and $E_z \sim 0.7$ V/um. This length of 3 millimeters was the length used in the experimental models.

Figure 11:
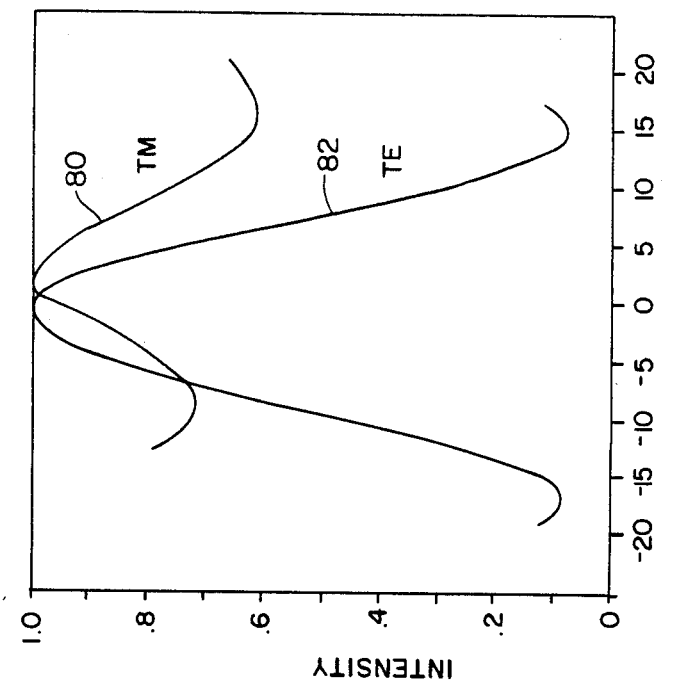
FIG. 11 is a plot of output intensity relative to the input intensity for TM- and TE-like modes as a function of applied potential for the device of FIG. 8 with electrode interconnections as shown in FIG. 10.
Figure 10:
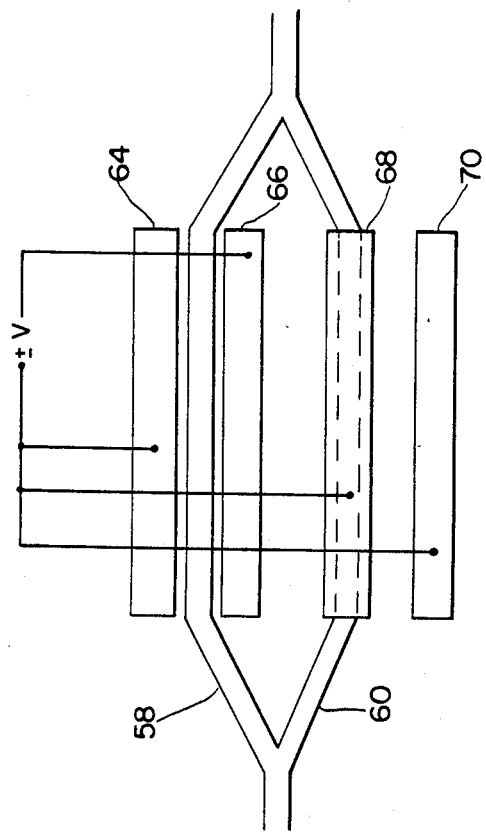
FIG. 10 illustrates a technique of electrode interconnection for reducing the number of voltages required for polarization-independent operation in the device of FIG. 8.

In general, four voltages are required to provide polarization-independent operation of this design. That is, two voltages are required to tune the switch 50 for crossover operation, and two different voltages are required to tune if for straight-through operation. However, FIG. 10 illustrates how potential may be applied between the electrodes so that only two voltages are required, although this will degrade the operation of the device. In the embodiment of FIG. 10, electrodes 64, 68 and 70 are connected in common and a potential of $\pm V$ is applied between them and electrode 66. FIG. 11 shows an experimentally obtained plot of the relative intensity of the TM-like and TE-like modes (curve 80 and 82, respectively) at the output region 54 in FIG. 8 as the potential applied between electrodes 64, 68 and 70 and electrode 66 is varied.

The use of only two applied voltages is possible in this case because fringing fields from one electrode arrangement (electrode 64 and 66) induce fields under the other electrode arrangement (electrodes 68 and 70), thus coupling the two types of electrode arrangements. In this case, equations (16) and (17) are not strictly obeyed since $E_y$ becomes a function of $E_z$ (or vice versa). These equations however are strictly obeyed in the devices of FIGS. 12 and 13. In FIG. 11, the fact that the periods (the interval between maxima and minima) of the TE and TM waves are roughly the same (15 volts) indicates polarization-independent operation.

Figure 12:
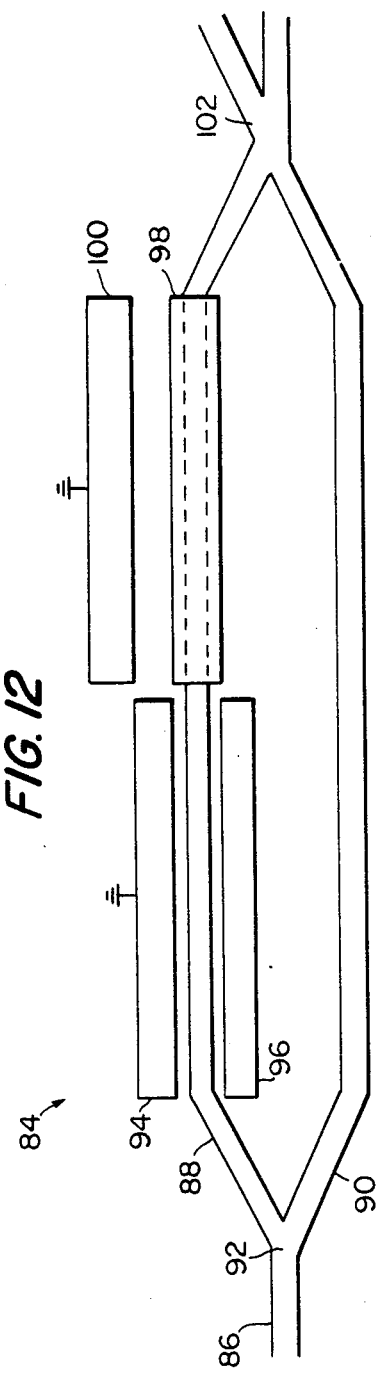
FIGS. 12 and 13 illustrate additional embodiments of polarization-independent branching waveguide switch/modulators.

FIG. 12 illustrates an alternative embodiment of a polarization independent branching waveguide modulator/switch 84 in which the phase shift is induced in only one channel. Light is coupled from single-mode input arm 86 into channel waveguides 88 and 90 via a branching waveguide 3-dB coupler 92. Electrodes 94 and 96 are disposed adjacent waveguide 88 for applying a primarily horizontally-directed field through the waveguide, while electrode 98 and electrode 100 are disposed over and adjacent waveguide 88, respectively, for applying a primarily vertically-directed field through the waveguide. This embodiment also includes a mode-separating coupler 102 for separating the different modes which in effect propagate in the two waveguide channels 88 and 90. The operation of such a coupler is described in "Optical modal evolution 3 db coupler" by W. K. Burns et al., Applied Optics, Vol. 15, p. 1053 (1976).

Figure 13:
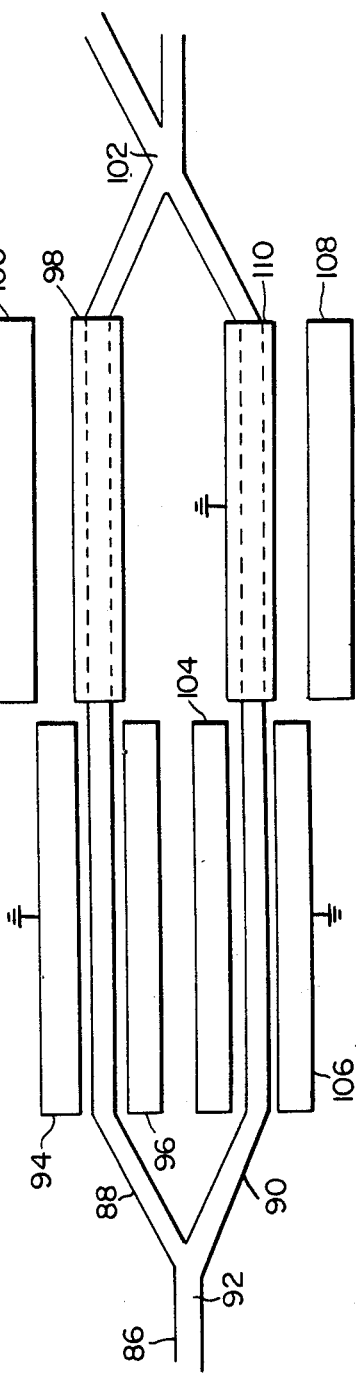

FIG. 13 illustrates an extension of the embodiment of FIG. 12 in which the phase shift is applied to both waveguide channels in a push-pull manner. In this embodiment, in addition to electric fields being applied to waveguide 88, electrodes 104 and 106 are disposed adjacent waveguide 90 for applying a primarily horizontally-directed field and electrodes 108 and 110 are disposed adjacent to and over waveguide 90 for applying a primarily vertically-directed field. If fabricational symmetry has been accomplished, the potentials applied to the electrodes in proximity to waveguide 88 are equal in magnitude and opposite in sense to the potentials applied to the electrodes in proximity to waveguide 90.

The procedure for tuning or designing the foregoing branching waveguide modulator-switches of FIGS. 8, 10, 12 and 13 is readily apparent in view of the earlier discussion in connection with the modal interference coupler of FIG. 1. All of the considerations mentioned in that earlier description are equally applicable to these additional embodiments. Consequently, the operation of the embodiments will not be further described in this discussion.

Obviously, many modifications and variations of the present invention are possible in light of the above teachings. It is therefore to be understood that within the scope of the appended claims, the invention may be practiced otherwise than as specifically described.

What is claimed and desired to be secured by Letters Patent of the United States is:

1. In an optical channel waveguide switch/modulator of the type having a two-channel region wherein phase shift of a propagating wave is effected by electrically modulating the modal propagation constant of at least one of said two channels, an improved electrode arrangement which provides polarization-independent operation comprising:
   a first configuration of electrodes disposed in proximity to the channels to permit the application of an electric field that is primarily horizontally directed in at least one channel; and
   a second configuration of electrodes disposed in proximity to the channels to permit the application of an electric field that is primarily vertically directed in at least one channel.

2. The improved electrode arrangement as recited in claim 1 wherein said first configuration of electrodes and said second configuration of electrodes are disposed in proximity to a first channel of said two channels to permit the application of said primarily-horizontally-directed electric field and said primarily-vertically-directed electric field in said first channel.

3. The improved electrode arrangement as recited in claim 2 further comprising:
   a third configuration of electrodes disposed in proximity to the second channel of said two channels to permit the application of a primarily-horizontally-directed electric field in said second channel; and
   a fourth configuration of electrodes disposed in proximity to the second channel to permit the application of a primarily-vertically-directed electric field in said second channel.

4. The improved electrode arrangement as recited in claim 1 wherein said first configuration of electrodes is disposed to permit the application of a first primarily-horizontally-directed electric field in each channel and wherein said second configuration of electrodes is disposed to permit the application of a first primarily-vertically-directed electric field in each channel.

5. The improved electrode configuration as recited in claim 4 further comprising:
   a third configuration of electrodes disposed in proximity to said channels to permit the application of a second primarily-horizontally-directed electric field in each channel; and
   a fourth configuration of electrodes disposed in proximity to said channels to permit the application of a second primarily-vertically-directed electric field in each channel.

6. An optical channel waveguide switch/modulator which comprises:
   a pair of waveguides having mutually parallel portions spaced apart a distance to permit directional coupling therebetween;
   a first configuration of electrodes disposed in proximity to said parallel portions for providing a primarily-horizontally-directed electric field in a first section of said parallel portions; and
   a second configuration of electrodes disposed in proximity to said parallel portions for providing a primarily-vertically-directed electric field in a second section of said parallel portions.

7. The optical channel waveguide switch/modulator as recited in claim 6 further comprising:
   a third configuration of electrodes disposed in proximity to said parallel portions for providing a primarily-vertically-directed electric field in a third section of said parallel portions.

8. The optical channel waveguide switch/modulator as recited in claim 6 further comprising:
   a fourth arrangement of electrodes disposed in proximity to said parallel portions for providing a primarily-horizontally-directed electric field in a fourth section of said parallel portions.

9. The optical channel waveguide switch/modulator as recited in claim 8 further comprising:
   a third configuration of electrodes disposed in proximity to said parallel portions for providing a primarily-vertically directed electric field in a third section of said parallel portions.

10. The optical channel waveguide switch-modulator of claim 6 wherein said first configuration of electrodes comprises:
   a center electrode disposed between said waveguides in said first section; and
   two outer electrodes disposed outside said waveguides in said first section, the application of potential between said center electrode and said two outer electrodes providing said electric field that is primarily-horizontally-directed in said first section; and
wherein said second configuration of electrodes comprises:
   a first electrode disposed over one of said waveguides; and
   a second electrode disposed over the other of said waveguides, the application of potential between said first and second electrodes providing said electric field that is primarily-vertically-directed in said second section of said waveguides.

11. The optical channel waveguide switch/modulator of claim 10 further comprising:
   a third configuration of electrodes disposed in proximity to said parallel portions for providing a primarily-horizontally-directed electric field in a third section of said parallel portions, said third configuration comprising,
   a center electrode disposed between said waveguides in said third section,
   and two outer electrodes disposed outside said waveguides in said third section, the application of potential between said center electrode and said two outer electrodes providing said primarily-horizontally-directed field in said third section; and
   a fourth configuration of electrodes disposed in proximity to said parallel portions for providing a primarily-vertically-directed electric field in a fourth section of said parallel portions, said fourth configuration comprising,
   a first electrode disposed over one of said waveguides, and
   a second electrode disposed over the other of said waveguides, the application of a potential between said first and second electrodes providing said primarily-vertically-directed electric field in said fourth section.

12. An optical branching-waveguide switch/modulator which comprises:
   a first channel waveguide having a first configuration of electrodes disposed in proximity thereof, said first configuration comprising a first electrode disposed adjacent one side of said first channel and a second electrode disposed adjacent the other side of said first channel, the application of an electric potential between said first and second electrodes providing a primarily-horizontally-directed electric field in said first channel;
   a second channel waveguide having a second configuration of electrodes disposed in proximity thereof, said second configuration comprising a third electrode disposed over said second channel waveguide and a fourth electrode disposed adjacent said second channel waveguide, the application of an electric potential between said third and fourth electrodes providing a primarily-vertically-directed electric field in said second channel;
   means for dividing an input signal between said first and said second channel waveguides; and
   means for combining the outputs of said first and second channel waveguides.

13. An optical branching waveguide switch/modulator which comprises:
   a first channel waveguide having a first configuration of electrodes disposed in proximity to a first section thereof, and a second configuration of electrodes disposed in proximity to a second section thereof,
   said first configuration comprising a first electrode disposed adjacent one side of said first channel and a second electrode disposed adjacent the other side of said channel, the application of an electric potential between said first and second electrodes providing a primarily-horizontally-directed electric field in said first section of said first channel,
   said second configuration comprising a third electrode disposed over said first channel waveguide and a fourth electrode disposed adjacent said first channel, the application of an electric potential between said third and fourth electrodes providing a primarily-vertically-directed electric field in said second section of said first channel;
   a second channel waveguide;
   means for dividing an input signal between said first and said second channel waveguides; and
   means for combining the outputs of said first and said second channel waveguides.

14. An optical branching waveguide switch modulator as recited in claim 13 further comprising:
   a third configuration of electrodes disposed in proximity to a first section of said second channel waveguide, said third configuration comprising a fifth electrode disposed adjacent one side of said second channel and a sixth electrode disposed adjacent the other side of said second channel, the application of an electric potential between said fifth and sixth electrodes providing a primarily-horizontally directed electric field in said first section of said second channel; and
   a fourth configuration of electrodes disposed in proximity to a second section of said second channel waveguide, said fourth configuration comprising a seventh electrode disposed over said second channel waveguide and an eighth electrode disposed adjacent said second channel, the application of an electric potential between said seventh and eighth electrodes providing a primarily-vertically-directed electric field in said second section of said second channel.

15. An optical branching waveguide switch/modulator which comprises:
   a first channel waveguide;
   a second channel waveguide substantially parallel with said first channel waveguide;
   a first electrode disposed adjacent said first channel waveguide on the side of said first waveguide opposite from said second waveguide;
   a second electrode disposed adjacent said first waveguide between said first and second waveguides;
   a third electrode disposed over said second waveguide;
   a fourth electrode disposed adjacent said second waveguide on the side of said second waveguide opposite from said first waveguide;
   means for dividing an input signal between said first and second waveguides; and means for combining the outputs of said first and second waveguides.

16. An optical branching waveguide switch/modulator as recited in claim 15 wherein said first, third and fourth electrodes are connected in common, the application of a source of potential between said second electrode and said commonly-connected electrodes providing polarization-independent operation.

* * * * *